United States Patent
Messiet

Patent Number: 5,875,404
Date of Patent: Feb. 23, 1999

[54] DIGITAL RADIOTELEPHONE INSTALLATION WITH MOBILE TERMINALS

[75] Inventor: Samira Messiet, Versailles, France

[73] Assignee: Alcatel Mobile Phones, Paris, France

[21] Appl. No.: 632,425

[22] PCT Filed: Oct. 25, 1994

[86] PCT No.: PCT/FR94/01242

§ 371 Date: Apr. 24, 1996

§ 102(e) Date: Apr. 24, 1996

[87] PCT Pub. No.: WO95/12293

PCT Pub. Date: May 4, 1995

[30] Foreign Application Priority Data

Oct. 26, 1993 [FR] France ................................ 93/12740

[51] Int. Cl.$^6$ .............................. H04B 1/38; H04M 1/00; H04M 1/66

[52] U.S. Cl. ......................... 455/558; 455/411; 379/357

[58] Field of Search .................................. 455/558, 557, 455/550, 410, 411, 422, 551, 552, 553; 379/144, 357

[56] References Cited

U.S. PATENT DOCUMENTS

| | | | |
|---|---|---|---|
| 5,259,018 | 11/1993 | Grimmett et al. | 455/551 |
| 5,404,580 | 4/1995 | Simpson et al. | 455/558 |
| 5,657,373 | 8/1997 | Hermansson et al. | 455/558 |

FOREIGN PATENT DOCUMENTS

| | | |
|---|---|---|
| 0556970A1 | 8/1993 | European Pat. Off. . |
| 0586081A1 | 3/1994 | European Pat. Off. . |
| WO9112698 | 8/1991 | WIPO . |
| WO0586081A1 | 3/1994 | WIPO . |
| WO9219078 | 10/1995 | WIPO . |

OTHER PUBLICATIONS

P. Jolie et al, "Une application de la carte a microprocesseur: Le lmodule d'identite d'abonne du radiotelephone numerique eruopeen", L'Echo Des Recherches, No. 139, 1990, Issy–Les Moulineaux, pp. 1–20.

Primary Examiner—Dwayne D. Bost
Assistant Examiner—Tracy M. Legree
Attorney, Agent, or Firm—Sughrue, Mion, Zinn, Macpeak & Seas, PLLC

[57] ABSTRACT

A digital radiotelephone installation with mobile terminals includes a fixed base transceiver station, which is an element of the network, and mobile telephone terminals at least some of which are designed to be unable to access the network until a user has inserted therein an extractable personalized smart card ("SIM card"). Each mobile terminal is designed to receive, in addition to the extractable "conventional" SIM card, another, auxiliary SIM smart card which remains in the mobile terminal at all times. The auxiliary SIM card corresponds to the same personalized subscription as the conventional SIM card. The extractable conventional SIM card takes precedence over the auxiliary SIM card when it is inserted into said mobile terminal, however, and has the same functionality as the latter. The auxiliary SIM card is assigned by the network or by said terminal only specific predefined services, such as typically an answering function and/or a short messages service function, the predefined services possibly including outgoing call restriction.

15 Claims, 1 Drawing Sheet

DIGITAL RADIOTELEPHONE INSTALLATION WITH MOBILE TERMINALS

BACKGROUND OF THE INVENTION

1. Field of the Invention

The present invention concerns a digital radiotelephone installation with mobile terminals known as "earphones". It concerns in particular mobile terminals that can be used in an installation of this kind and specific access control means included in the latter.

2. Description of the Prior Art

In a conventional digital mobile radiotelephone installation, the radio coverage is currently organized in the following manner:

The terrestrial coverage area is divided into a mosaic of hexagonal cells having a radius between one kilometer and 35 kilometers, depending on the environment. In open country it is in the order of 35 kilometers whereas in urban areas it is in the order of 1 kilometer to 3 kilometers.

A fixed base transceiver station (BTS) is provided at the center of each hexagonal coverage cell and provides the radio link to all the mobile terminals within the perimeter of that cell. It therefore comprises all the radio equipment necessary to provide the coverage of a cell.

Each digital mobile terminal is usually adapted to receive a plug-in smart card ("SIM card") that contains all the data specific to the user's subscription and enables the latter to access the telephone network via the nearest base transceiver station. Insertion of the SIM card by the user therefore personalizes the terminal and renders it operational. Access to the network is usually possible only after entering the personal access code ("PIN code") using the keypad of the mobile terminal.

To this end the network includes access control means constituting what are usually called a Home Location Register (HLR) and a Visitor Location Register (VLR) holding such data and codes specific to the user's subscription and adapted selectively to enable calls involving that user. The BTS consult the HLR and the VLR.

However, many users require to be contactable at all times, even when they are absent. Consequently, a number of manufacturers additionally offer on each mobile terminal an answering function and/or a short messages service (SMS) function.

A mobile terminal is designed to be inoperative if the SIM card is not inserted into it, with the exception of the ability to make a number of emergency calls, of course; the user must therefore leave their SIM card in the mobile terminal if they want to use the telephone answering machine function and/or the short messages service function. The user must also have entered their access code, of course.

This conventional solution has two major drawbacks:

the user is then unable, when moving around, to use their SIM card to phone from another terminal, since the card must remain in the original terminal if messages are to be received;

the mobile terminal is not secure, since it contains an SIM card for which the access code has been entered: anyone can then telephone using the terminal, with the user responsible for the charges incurred, and if the terminal is stolen it can immediately be used to make calls, again at the cost of the user.

The article "Une application de la carte à microprocesseur: le module d'identité d'abonné du radiotéléphone numérique européen" ("A smart card application: the subscriber identity module of the European digital radiotelephone") by P. Jolie et al published in l'Echo des Recherches, N° 139, 1st quarter 1990, mentions a digital radiotelephone mobile terminal adapted to receive an extractable personalized smart card (SIM card) and another, auxiliary SIM smart card that remains in the terminal at all times, this auxiliary SIM card corresponding to the same personalized subscription as said conventional SIM card and having the same functionality as the latter, although the extractable conventional SIM card takes precedence over said auxiliary SIM card when it is inserted into the mobile terminal.

However, as both cards have the same functions the problem is exactly as previously stated.

A terminal using two SIM cards is also described in document EP-0 556 970A1 but this has only one card reader and uses only one card at a time, the other one remaining accessible, which does not solve the problem as stated here; neither does document WO 91/12 698 which describes a set with only one card.

SUMMARY OF THE INVENTION

The invention is directed to remedying these drawbacks. To this end it concerns a digital radiotelephone installation with mobile terminals including a fixed base transceiver station, which is an element of the network, and mobile telephone terminals at least some of which are designed to be unable to access the network until a user has inserted therein an extractable personalized smart card ("SIM card"), wherein said mobile terminals are each designed to receive, in addition to said extractable "conventional" SIM card, another, auxiliary SIM smart card of small size, such as a "micro-SIM" card, which remains in the mobile terminal at all times and can normally be extracted only by a technician, said auxiliary SIM card corresponding, with a different code number internal to the network, to the same personalized subscription as said conventional SIM card and having the same functionality as the latter, but being assigned by the network or by the terminal only predefined services, such as typically an answering function and/or a short messages service function, said predefined services possibly including outgoing call restriction, said two SIM cards being administered as two separate cards, the extractable conventional plug-in SIM card taking precedence over said auxiliary SIM card when it is inserted into the mobile terminal, however.

BRIEF DESCRIPTION OF THE DRAWINGS

The invention will be clearly understood and its advantages and other features will emerge more clearly from the following description of one nonlimiting embodiment given with reference to the single appended FIGURE which is a simplified block diagram of the installation.

DETAILED DESCRIPTION OF THE PREFERRED EMBODIMENT

Figure 1:
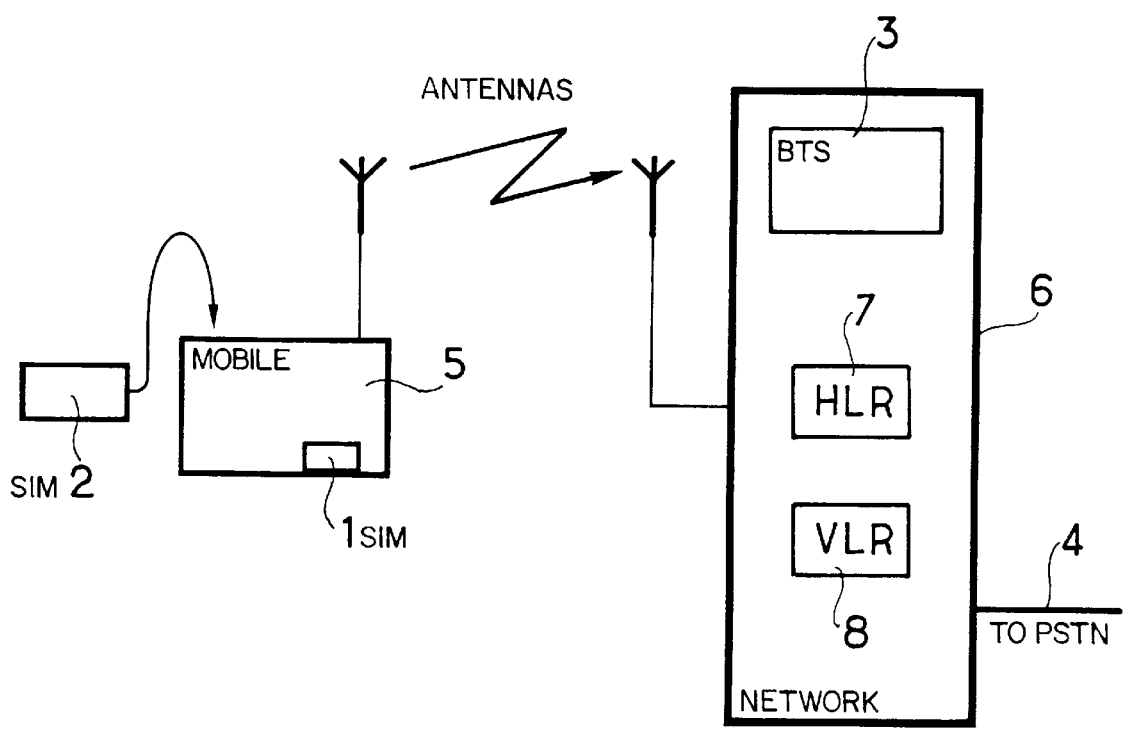

Referring to the single FIGURE, the network 6 includes a base transceiver station 3, a connection 4 to the general telephone network, an HLR 7 and a VLR 8.

Mobile terminals 5 ("earphones") are linked by radio to the base transceiver station 3 and thus to the network.

Each terminal 5 is a non-dedicated unit, i.e. it is not in itself personalized to a particular user.

Personalization is effected by the user inserting a smart card 2 ("SIM card") into the terminal 5, which has the necessary provisions for this. This conditions access of the user to the network, enabling the user to send and receive telephone information without restriction. As a general rule, the mobile terminal 5 is not operative until the user has also typed in their secret access code ("PIN code").

The card 2, referred to hereafter as the "SIM 2" card, is to the standard "ISO" format, i.e. it is the same size as a credit card.

From the point of view of the user, it corresponds to a subscriber number used for billing. From the point of view of the network, it additionally corresponds to an individual code number, known from the HLR or the VLR, which is not the same as the subscriber's code number.

The drawback already mentioned is that the terminal 5 can only implement the answering or short messages service function in the absence of the user if the user leaves their SIM 2 card in the terminal.

To remedy this drawback the invention proposes to incorporate another "SIM" card 1, referred to hereafter as the "SIM 1" card, into the terminal 5, where it remains at all times.

The SIM card 1 is identical to the SIM card 2 in the sense that it has the same features and functions. On the other hand, it is mechanically different in that it is of a smaller size, typically the "micro-SIM" format. Also, it cannot merely be plugged into mobile 5; instead it has to be fitted into the mobile by a technician (it is screwed into place and concealed).

In accordance with the invention, the SIM 1 card corresponds to the same subscriber number as the SIM 2 card. From the point of view of the network, on the other hand, it corresponds to an individual code number that is not the same as that of the SIM 2 card. The HLR and the VLR associate the code numbers of the SIM 1 and SIM 2 cards with the same subscriber number. The protocols for administration of the SIM 2 and SIM 1 cards by the network 6 (and/or by the terminal 5) are different.

Additionally, and essentially, the administration protocol for the SIM 1 card is adapted to assign to the card only specific service functions, in this example an answering function and a short messages service function.

The administration protocol for the SIM 1 card can optionally include an outgoing call restriction function.

Apart from emergency calls that each terminal 5 can make, in accordance with the applicable legal obligations, the SIM 1 card allows transmission to the station 3 of only pre-recorded messages of the answering or short messages service (SMS) function.

By virtue of its administration protocol, the SIM 2 card takes precedence over the SIM 1 card. In other words, inserting the SIM 2 card cancels the logging on of the SIM 1 card. If the SIM 1 card is communicating at the time the SIM 2 card is inserted, it is preferable for the latter cancellation to be effected only at the end of the call.

Activation of the SIM 1 card by the user requiring to receive messages when absent is preferably possible only after the user has entered an access code ("PIN code") specific to the SIM 1 card.

When the SIM 2 card is inserted, the mobile 5 can continue to provide the answering function. It can also continue to receive short messages on the SIM 2 card: the user can take the SIM 2 card with them and retrieve the short messages later, on another terminal.

The network can provide a function whereby the SIM 2 card can be used for remote interrogation of the SIM 1 card because, although it corresponds to the same subscriber number as the SIM 2 card (so that only one subscriber is billed), from the point of view of the network the SIM 1 card corresponds to its own (and therefore different) code number. Messages from the SIM 1 card can be made secure by the use of DTMF signals.

If the user is away from their own terminal and at a location where they do not have personal access to a mobile terminal, they can still request transfer of their calls to another terminal, for example that of a secretary in a plant that they are visiting, by inserting their SIM 2 card into that terminal. A user does not have to stay near this terminal, since messages can be recorded on their SIM 2 card even if they are elsewhere in the plant.

The routing of calls is automatic and calls are transmitted to said SIM 2 card so that messages can be received by the answering function.

To enable this, the other terminal into which the SIM 2 card is inserted must be switched on and logged on to the network, and the answering function must be activated. If the short messages service is used, the other terminal sends callers a short message indicating that the called party is absent and inviting them to leave a short message.

From an internal point of view the SIM 1 and SIM 2 cards are therefore administered as two separate cards. Some parameters stored on the SIM 2 card can be different than those stored on the SIM 1 card: the directory (stored numbers) may be different on the two cards, for example, especially if the SIM 2 card has been used in another terminal.

To facilitate administration of the SIM 1 and SIM 2 cards there is no provision for transfer of parameters between the two cards.

The storage of short point-to-point messages in memory is effected indifferently on one or other of the SIM 1 or SIM 2 cards. A specific menu enables the user to access the required field.

It goes without saying that the invention is not limited to the embodiment just described and many variants and expansions of the radiotelephone system can be envisaged without departing from the scope of the invention.

I claim:

1. Digital radiotelephone installation with mobile terminals, said installation including a network with at least one fixed base station transceiver, and mobile terminals at least some of which are designed to be unable to access the network until a user has inserted therein an extractable personalized SIM card,
    said mobile terminals being each designed to receive, in addition to said extractable SIM card, an auxiliary SIM card which remains in said mobile terminal at all times,
    said auxiliary SIM card corresponding to the same personalized subscription as said extractable SIM card,
    said extractable SIM card taking precedence over said auxiliary SIM cards when said extractable SIM card is inserted into said mobile terminal, and having the same functionality as said auxiliary SIM card,
    wherein said auxiliary SIM card is assigned by said network, or by said terminal, only specific predefined services, such as an answering function, a short messages service function, or an outgoing call restriction.

2. Installation according to claim 1 wherein said auxiliary SIM card has a small format, said small format capable of being a micro-SIM format.

3. Installation according to claim 1 wherein said auxiliary SIM card has a code number internal to said network that is not the same as the code number specific to said extractable SIM card, and said extractable SIM card and said auxiliary SIM card have the same subscriber number.

4. Installation according to claim 3 adapted to administer a facility for remote interrogation of messages stored in said auxiliary SIM card from another terminal of the network subject to insertion of said extractable SIM card in said another terminal.

5. Installation according to claim 1 wherein said extractable SIM card and said auxiliary SIM card are administered as two separate cards.

6. Installation according to claim 1 including a provision enabling, at a location where personal access to a mobile terminal is not available, to request transfer of calls to another terminal by inserting said extractable SIM card in said another terminal, thereby receiving messages on said extractable SIM card.

7. Installation according to claim 1 adapted to receive short messages on said auxiliary SIM card and on said extractable SIM card when the extractable SIM card is plugged into the terminal that contains said auxiliary SIM card.

8. Digital radiotelephone mobile terminal adapted to receive an extractable personalized SIM card and an auxiliary SIM smart card, said auxiliary SIM card remaining in said mobile terminal at all times, said auxiliary SIM card corresponding to the same personalized subscription and having the same functionality as said extractable SIM card, said extractable SIM card taking precedence over said auxiliary SIM card when said extractable SIM card is inserted into said mobile terminal, wherein said auxiliary SIM card is assigned by said terminal only specific predefined services, such as an answering function, a short messages service function, or an outgoing call restriction.

9. Digital radiotelephone mobile terminal according to claim 8 wherein said auxiliary SIM card has a smaller format, said smaller format capable of being a micro-SIM format.

10. Digital radiotelephone mobile terminal according to claim 8 wherein said auxiliary SIM card has a code number internal to said network that is not the same as the code number specific to said extractable SIM card, and said extractable SIM card and said auxiliary SIM card have the same subscriber number.

11. Digital radiotelephone network comprising access control means adapted to associate with the same subscriber number an internal code number of an extractable SIM card and at least one access code and adapted to associate with the same subscriber number at least a second internal code number and a second access code corresponding to an auxiliary SIM card, wherein said auxiliary SIM card is assigned by said network only specific predefined services, such as an answering function, a short messages service function, or an outgoing call restriction.

12. Digital radiotelephone network according to claim 11 comprising means for administering said extractable SIM card and said auxiliary SIM card as two separate cards.

13. Digital radiotelephone network according to claim 12 comprising means for administering remote interrogation of messages stored in said auxiliary SIM card contained in a terminal of said network from another terminal of said network into which said extractable SIM card associated with said same subscriber number has been inserted.

14. Digital radiotelephone network according to claim 12 comprising means enabling, at a location where personal access to a mobile terminal is not available, to request transfer of calls to another terminal by inserting said extractable SIM card into said another terminal, thereby receiving messages on said extractable SIM card.

15. Digital radiotelephone network according to claim 12 comprising means for receiving short messages on said auxiliary SIM card or on said extractable SIM card when said extractable SIM card is plugged into the terminal that contains said auxiliary SIM card.

* * * * *